United States Patent
Anzai et al.

(10) Patent No.: US 7,148,874 B2
(45) Date of Patent: Dec. 12, 2006

(54) ANGLE ADJUSTING DEVICE FOR A DISPLAY

(75) Inventors: Masato Anzai, Machida (JP); Tohru Tsunekawa, Yokohama (JP); Akihiro Funakoshi, Kamakura (JP); Kazuhiko Yamazaki, Hiratsuka (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 802 days.

(21) Appl. No.: 09/681,914

(22) Filed: Jun. 26, 2001

(65) Prior Publication Data

US 2001/0055196 A1  Dec. 27, 2001

(30) Foreign Application Priority Data

Jun. 27, 2000  (JP) .............................. 2000-193477

(51) Int. Cl.
*G09G 5/00* (2006.01)
(52) U.S. Cl. ...................... 345/156; 345/901; 345/905; 361/681
(58) Field of Classification Search ................ 345/156, 345/901, 905; 248/371, 181, 185; 361/681
See application file for complete search history.

(56) References Cited

U.S. PATENT DOCUMENTS

| | | | | |
|---|---|---|---|---|
| 4,415,136 A | * | 11/1983 | Knoll | 248/181 |
| 4,575,033 A | * | 3/1986 | Henneberg et al. | 248/185 |
| 4,832,419 A | * | 5/1989 | Mitchell et al. | 312/7.2 |
| 6,094,341 A | * | 7/2000 | Lin | 361/681 |
| 6,266,241 B1 | * | 7/2001 | Van Brocklin et al. | 361/687 |
| 6,384,811 B1 | * | 5/2002 | Kung et al. | 345/168 |
| 6,430,038 B1 | * | 8/2002 | Helot et al. | 361/681 |
| 6,464,195 B1 | * | 10/2002 | Hildebrandt | 248/460 |
| 6,493,216 B1 | * | 12/2002 | Lin | 361/681 |
| 6,498,721 B1 | * | 12/2002 | Kim | 361/681 |
| 6,608,749 B1 | * | 8/2003 | Hubbard | 361/683 |

FOREIGN PATENT DOCUMENTS

| | | |
|---|---|---|
| JP | 5-46184 | 6/1993 |
| JP | 06-022919 | 2/1994 |
| JP | 2000-56695 | 2/2000 |
| JP | 2001-240167 | 9/2001 |

* cited by examiner

*Primary Examiner*—Richard Hjerpe
*Assistant Examiner*—Kimnhung Nguyen
(74) *Attorney, Agent, or Firm*—F. Chau & Associates LLC

(57) ABSTRACT

The display device includes a pedestal having a planar pedestal main body to be placed on a placing object and a planar arm that is arranged in a standing manner having a specified angle against the pedestal main body, and a display portion that is installed to the arm in a swinging manner and has an image display portion. In the case where the center of gravity of the display portion is within a range of a projection surface of the pedestal, the swinging angle of the display portion can be optimally set.

12 Claims, 13 Drawing Sheets

(a)

(b)

(a)

(b)

(a)

(b)

(c)

ANGLE ADJUSTING DEVICE FOR A DISPLAY

BACKGROUND OF INVENTION

The present invention relates to a display device, particularly to a display device with an excellent portability.

Conventionally, CRT (Cathode Ray Tube) has been mainly used as a display device of a personal computer (hereinafter referred to as PC). However, progress of high resolution CRT is slow, and on the other hand, high resolution of a liquid crystal display device can be relatively easily achieved, because fine processing can be performed on the liquid crystal display device. Moreover, the liquid crystal display device has the advantage that the thickness thereof can be thinner than that of CRT. Therefore, demand for the liquid crystal display device as a display device of PC has been increasing. The increase in demand has become one of the reasons for reducing the manufacturing cost of the liquid crystal display device, which further accelerates spreading of the liquid crystal display device. The liquid crystal display device, because of its characteristic being a thin type display device, is used as a display device of a notebook type PC and a display device of a thin type TV, not to mention as a display device of a desktop type PC.

A supporting device is provided for the display device, which sets the liquid crystal display device in an angle suitable for every user. Various suggestions have made for the supporting device. For example, Japanese Utility Model Laid-open No. Hei 5-46184 discloses a supporting device that can be used not only by placing on a desk but also by hanging on a wall, and whose screen angle also is adjustable. Japanese Patent Laid-open No. 2000-56695 discloses a supporting device of a thin type display device that enables a placing pedestal to be folded, the placing pedestal being placed on a placing object such as a desk, and, at the same time, is capable of automatically supporting the thin type display device at a specified tilted angle by the folding action.

As described above, the liquid crystal display device is used for a notebook type PC. Although the notebook type PC can be carried, the liquid crystal display device needs to be protected when the PC is being carried. For this reason, as well-known, an image display portion of the liquid crystal display device is designed to be hidden when the notebook type PC is folded.

Since the liquid crystal display device is thinner than CRT, it is effective for space saving. There is a demand that more space for working on a desk should be secured by folding the PC to be stored, for example, on a bookshelf, when it is not needed.

When a presentation is given to other person by using the notebook type PC, displayed contents on the liquid crystal display device that is attached to the notebook PC cannot be watched with viewer when they sit opposing to the presenter. In such a case, if the presenter has a second monitor, the other person can watch the second monitor while the presenter watches the liquid crystal display device of the notebook type PC. Therefore, there is also a demand that only the liquid crystal display device body should be carried as a second monitor.

SUMMARY OF INVENTION

Accordingly, the object of the present invention is to provide a display device capable of being folded and stored when it is not needed, and capable of being carried.

Another object of the present invention is to provide an angle adjusting device that is effective for the angle adjustment of such a display device.

A feature of the present invention includes a display device that comprises a pedestal having a planar pedestal main body placed on a placing object and a planar arm portion that is arranged in a standing manner in a specified angle against the pedestal main body, and a display portion installed to the arm portion in a swinging manner having an image display portion, and the display device is capable of setting the optimum swinging angle of the display portion when the center of gravity of the display portion is within a projection surface area of the pedestal.

Further, another feature according to the present invention, provides a display device that includes a display portion having an image display portion for displaying an image based on inputted data, and a planar protective portion rotatably installed to the display portion with a peripheral portion thereof as an axis, and opposed in parallel to the display portion to cover the image display portion, and the planar protective portion functions as a pedestal in which a surface opposing to the display portion becomes a placing surface of a pedestal.

Still another feature of the present invention provides for a display device that includes a display portion having an image display portion for displaying an image based on inputted data, a supporting portion for supporting the display portion in a manner that a supporting angle is adjustable, and the supporting portion consists of an arm to which the display portion is rotatably installed and a pedestal to which the arm is rotatably installed, wherein the arm and the pedestal are arranged so as to be able to occupy the same plane.

The present invention provides an angle adjusting device that is preferable to be applied to the above-described display device. Specifically, the angle adjusting device of the present invention is characterized in that it comprises a pedestal that becomes a reference of the angle adjustment, an arm that is provided for the pedestal so as to be rotatable in a specified angle range, and a stopper on which a rotation action is performed by following the rotation action of the arm and that includes an engaging surface to engage the arm.

The present invention also provides an angle adjusting device in which a second member supports a first member at an optimum angle, and the angle adjusting device is characterized in that it comprises, a pedestal that becomes a reference of the angle adjustment, the first member that is rotatably arranged around a first rotation axis provided on the pedestal as a center, and the second member that is rotatably arranged around a second rotation axis provided on the pedestal as a center so as to cross the first rotation axis and a part of which is positioned above the first member.

Various other objects, features, and attendant advantages of the present invention will become more fully appreciated as the same becomes better understood when considered in conjunction with the accompanying drawings, in which like reference characters designate the same or similar parts throughout the several views.

BRIEF DESCRIPTION OF DRAWINGS

For a more complete understanding of the present invention and the advantages thereof, reference is now made to the following description taken in conjunction with the accompanying drawings.

DETAILED DESCRIPTION

In the following, the display device according to the embodiments of the present invention will be described in detail with reference to the drawings.

For the purpose of being folded and stored, or being carried, the display device is preferably thinner and lighter. Considering these as preconditions, it is studied whether the above-described problems can be solved by having the same structure as a current notebook type PC.

By "opening" the notebook type PC from a folded state, an image display portion of the liquid crystal display device comes out. Therefore, the tilted angle of the image display portion can be adjusted by adjusting the opening angle. Incidentally, the notebook type PC is made of a PC main body and a display portion, and is used by placing the PC main body, for example, on a desk. In other words, the PC main body functions as a pedestal for the display portion. In this case, comparing the weights of the PC main body and the display portion, the PC main body is generally heavier. Accordingly, the PC main body will not become unstable even if the opening angle is made wide. On the contrary, when the PC main body is lighter than the display portion, the PC main body will not become unstable when the opening angle of the display portion is made wide.

In the case where the liquid crystal display device is made portable, it is assumed that the device has the same form as the current notebook type PC. As a result, the liquid crystal display device has a form that the PC main body portion of the notebook type PC is simply replaced by a pedestal. In the case of the notebook type PC, the PC main body works as a pedestal, there is no fear of upsetting even if the opening angle of the display portion is made wide because the PC main body portion has a considerable weight. However, in the case of the display device, reducing the weight of the pedestal portion is the easiest way in order to reduce the weight of the entire device. Accordingly, the weight of the pedestal becomes lighter than that of the display portion, thus the pedestal will become unstable when the opening angle of the display portion is made wide. To avoid upsetting, the weight of the pedestal is made heavier than that of the display portion, however, it is not preferable when considering portability.

Inventors of the present invention, therefore, studied a structure of a display device such as a display device that will not become unstable even if the pedestal having a function to protect the image display portion of the display portion is lighter than the display portion. In the case of the same structure as the notebook type PC, it is understood that the display device will become unstable when the weight of the display portion becomes heavier than that of the pedestal as described above. Such state will be described in more detail.

Figure 12:
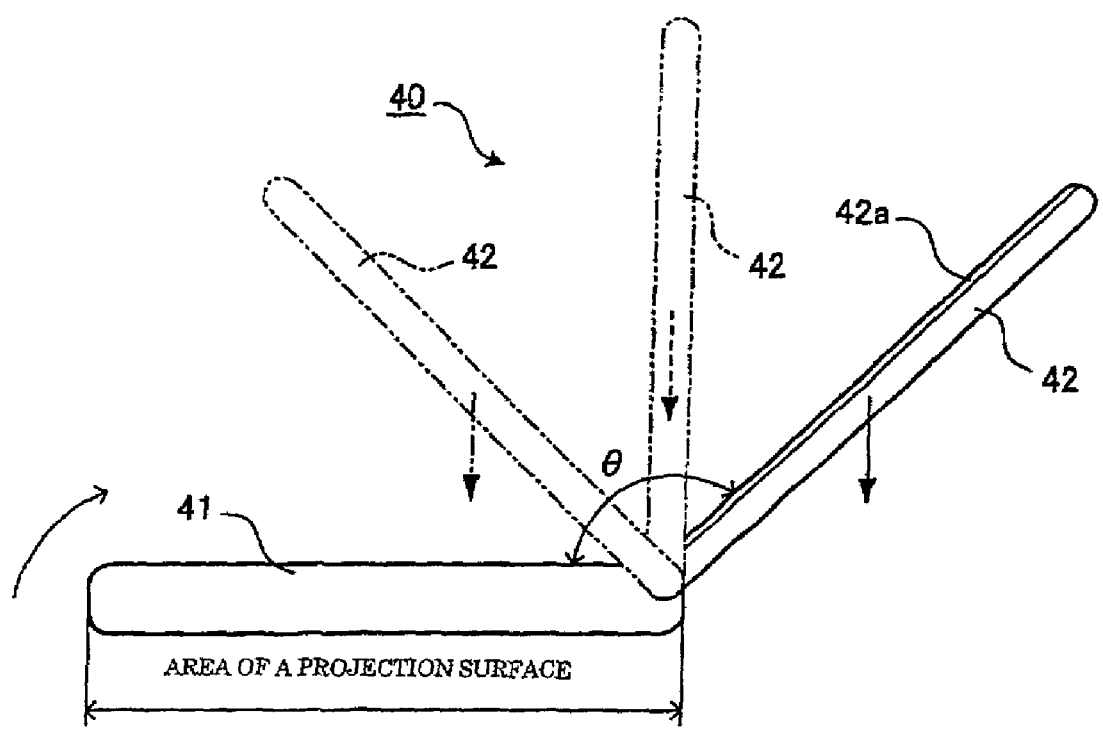
FIG. 12 is a side view showing the center of gravity of a display portion of a notebook type PC.

FIG. 12 is an exemplary view for showing the side of a notebook type PC 40. The notebook type PC 40 is constituted of a PC main body 41 being a pedestal and a display portion 42 with one edge portion thereof rotatably installed to the PC main body 41. A user of the notebook type PC 40 watches an image display portion 42a of the display portion 42 from the left direction in the drawing. In this case, an angle θ of the display portion 42 for the PC main body 41 is appropriately adjusted for the user to watch the image display portion 42a comfortably. The angle θ shows the above-described "opening". Moreover the angle θ is also called a tilted angle of the display portion 42. When the display portion 42 is positioned on the virtual lines, there is no fear of upsetting the PC main body 41. The PC main body 41 will not become unstable regardless of the relation between the weight of the PC main body 41 and the weight of the display portion 42. However, when the display portion 42 opens to the solid line position, the PC main body 41 may become unstable in the case where the display portion 42 is heavier than the PC main body 41. Here, the weight of the display portion 42 is presumed to affect from the center of gravity thereof. In FIG. 12, the downward arrows denote the center of gravity. Specifically, when the center of gravity, which is indicated by the downward arrows, of the display portion 42 stays within an area of a projection surface of the PC main body 41, there is no fear of upsetting the PC main body 41. The PC main body 41 will not become unstable regardless of the relation between the weight of the PC main body 41 and the weight of the display portion 42. But in the case where the center of the gravity of the display portion 42 is out of an area of a projection surface of the PC main body 41, when the display portion 42 is heavier than the PC main body 41, the PC main body 41 becomes unstable depending on the angle θ.

Using style of the notebook type PC 40 could be considered such that the opening angle θ of the display portion 42 is restricted in order to keep the center of gravity of the display portion 42 within the projection surface of the PC main body 41. But this is not a general style of the notebook type PC 40 being used. The notebook type PC is generally used by setting the opening angle θ at 90 degrees or more. This means that the center of gravity of the display portion 42 is outside of the area of the projection surface of the PC main body 41. When only a display device is considered, and since the pedestal is lighter in comparison with the PC main body 41 of the notebook type PC 40, as described above, there is some fear of upsetting the display compared to the notebook type PC 40. Specifically, it is difficult to realize a portable type display device in the similar form to the notebook type PC 40.

Figure 13:
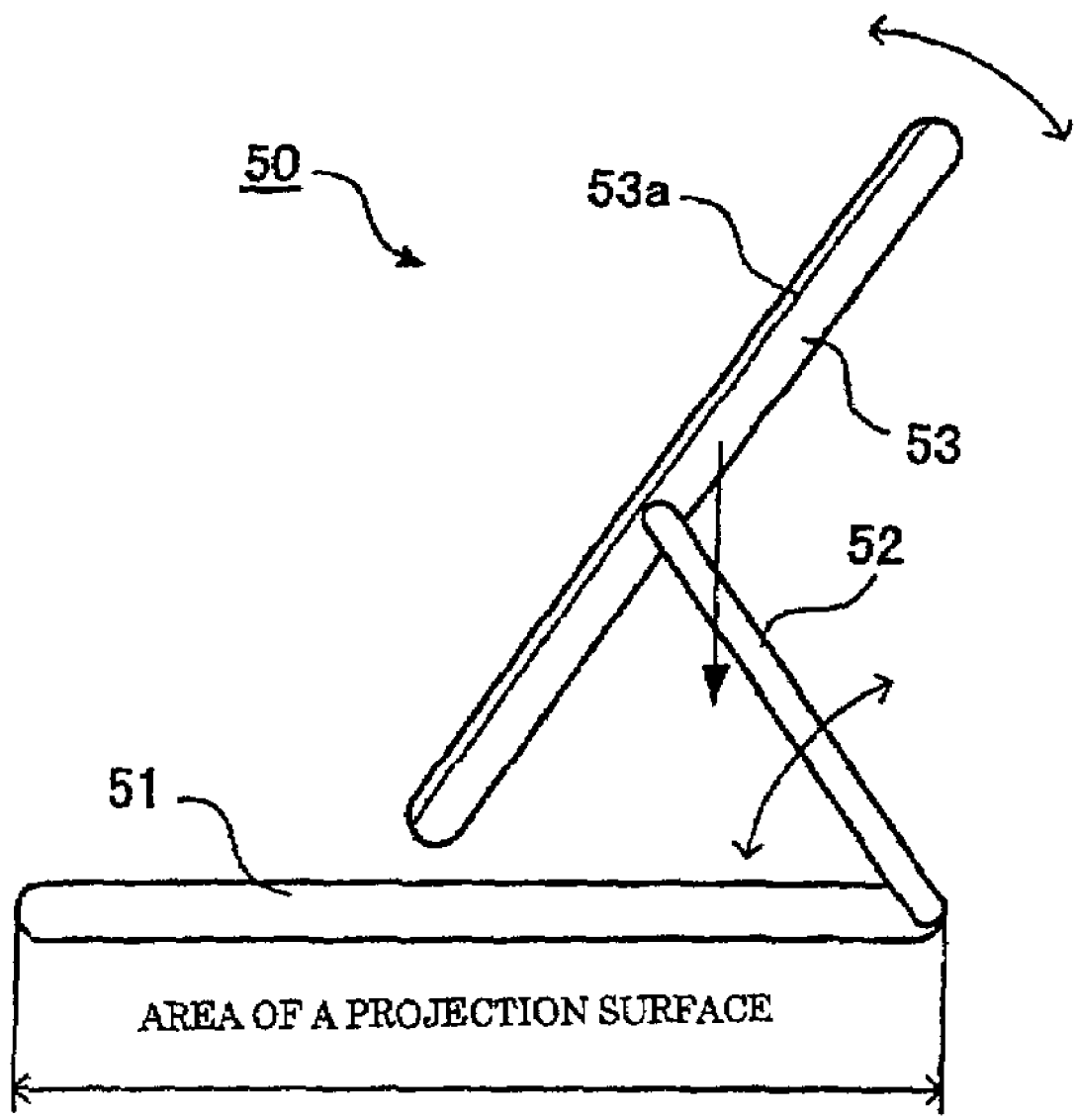
FIG. 13 is a side view showing the center of gravity of a display portion of a display device.

For example, as shown in FIG. 13, is assumed that a display device 50 is constituted of a pedestal 51, an arm 52 rotatably installed to the pedestal 51, and a display portion 53 rotatably installed to the arm 52. In such a position, the center of gravity of the display portion 53 can be positioned within the area of the projection surface of the pedestal 51 regardless of the tilted angle of the display portion 53. Therefore, even if the weight of the pedestal 51 is lighter than the weight of the display portion 53, the tilted angle of the display portion 53 can be optimally set. In other words, as shown in FIG. 13, it is shown that by making the arm 52 intervene between the pedestal 51 and the display portion 53, upsetting of the display device 50 can be prevented even if the pedestal is made lighter than the weight of the display portion 53.

Incidentally, when the notebook type PC 40 shown in FIG. 12 is closed, the PC main body 41 protects an image display portion 42a of the display portion 42. In the display device 50 shown in FIG. 13, the pedestal 51 is required to have a function to protect an image display portion 53a of the display portion 53 similar to the PC main body 41. The pedestal 51 corresponds to the PC main body 41 of the notebook type PC 40 in this regard. Therefore, when the notebook type PC 40 shown in FIG. 12 and the display device 50 shown in FIG. 13 are compared, it is understood that the display device 50 has a construction to which the arm 52 that does not exist in the notebook type PC 40 is added. The size (other than thickness) of the display device 50 is desirably the same size as the size of the display portion 53, and the arm 52 that is an added component, must not be a cause to increase the size of the display apparatus 50. When this point is considered, it is desirable that a portion of the pedestal 51 is made to function as the arm 52 and the pedestal 51 functions as a member to protect the image display portion 53a when protecting the image display portion 53a of the display portion 53. On the contrary, when the display device 50 is used while displaying an image on the display portion 53, a portion of the pedestal 51 may function as the arm 52 for setting the tilted angle of the display portion 53.

Since the display device of the present invention, by providing the pedestal main body and the arm portion, can optimally set the swinging angle of the display portion when the center of gravity of the display portion is within the projection area of the pedestal, there is no fear of upsetting the balance even if the pedestal main body is constructed of light planar members. In addition, since the pedestal main body and the arm portion are constituted in a planar manner, they can be parallelly laid on the display portion into a portable or storable form. In this case, the pedestal in the case where the pedestal main body and the arm portion are placed into the same plane, by having an approximate same surface area as the display portion and by parallelly opposing to the display portion, can cover the image display portion of the display portion.

In a conventional notebook type PC, as one can understand from FIG. 12, a keyboard exists on the PC main body surface that opposes to the image display portion. The surface on which the keyboard exists cannot be a placing surface for a top of a desk or the like. On the contrary, the planar protective portion of the image display device of the present invention functions as the pedestal in which a surface opposing to the display portion becomes a placing surface. This means that the angle of the display portion can be adjusted when the center of gravity of the display portion is within the projection area of the planar protective portion. From the viewpoint of the rotation angle of the planar protective portion against the display portion, the planar protective portion functions as the pedestal by rotating for 270 degrees or more from a parallelly opposing state to the display portion.

Thickness of the planar protective portion of the display device of the present invention can be thinner than that of the display portion. In such a manner, a thin display device of superior portability and storability is fabricated, in the case where the planar protective portion is parallelly opposed to the display portion.

Moreover, the weight of the planar protective portion of the present invention can be made lighter than that of the display portion. In the display portion of the present invention as described above, since the angle of the display portion can be adjusted when the center of gravity of the display portion is within the projection area of the planar protective portion, upsetting the balance of the display device in use can be avoided even if the weight of the planar protective portion is lighter than the display portion. And, this means that the weight of the entire display device can be reduced.

The display device of the present invention is constructed so that the arm comprising the supporting portion and the pedestal occupy the same plane, and the arm is rotatably installed to the display portion. Therefore, the arm and the pedestal, in a state that occupy the same plane and by appropriately rotating, can protect the image display portion of the display device.

In the display device of the present invention, it is desirable that the surface area of the supporting portion in the case where the arm and the pedestal occupy the same plane is made the same or more than the surface area of the image display portion and the same or less than the display portion. Accordingly, that contributes to a reduction in size of the entire display device while protecting the image display portion.

In the above-described angle adjusting device, a stopper performs the rotation action following the rotation action of the arm. Specifically, the larger the arm's angle against the pedestal becomes, the larger the stopper's angle against the pedestal becomes. In the case where the stopper's angle against the pedestal becomes a specified value or more, the arm's angle against the pedestal is maintained by the engaging of the arm and the stopper. In this case, it is desirable that the arm is made such that engaging with the stopper at the time of the arm rotation action is released.

In the angle adjusting device of the present invention, the stopper has a circular arc shaped engaging surface, and the engaging portion of the arm can move along the circular arc shaped engaging surface of the stopper.

In the angle adjusting device of the present invention, when the arm angle against the pedestal is 0 degree, the stopper's angle against the pedestal can be made 0 degree. Specifically, the arm and the stopper can be used for the display device of the present invention because they constitute the same plane.

In this angle adjusting device, when the first member is made to perform the rotation action, the first member pushes up the second member, thus the second member performs the rotation action. For example, when the second member becomes vertical to the pedestal, the angle of the first member against the pedestal can be maintained by engaging the first and second members. Note that the first rotation axis and the second rotation axis cross, but this does not mean crossing the axis as mechanical constituting elements. It means the crossing of the extended lines of the axis as mechanical elements. It is needless to say that an orthogonality is included as a typical crossing example.

Figure 1:
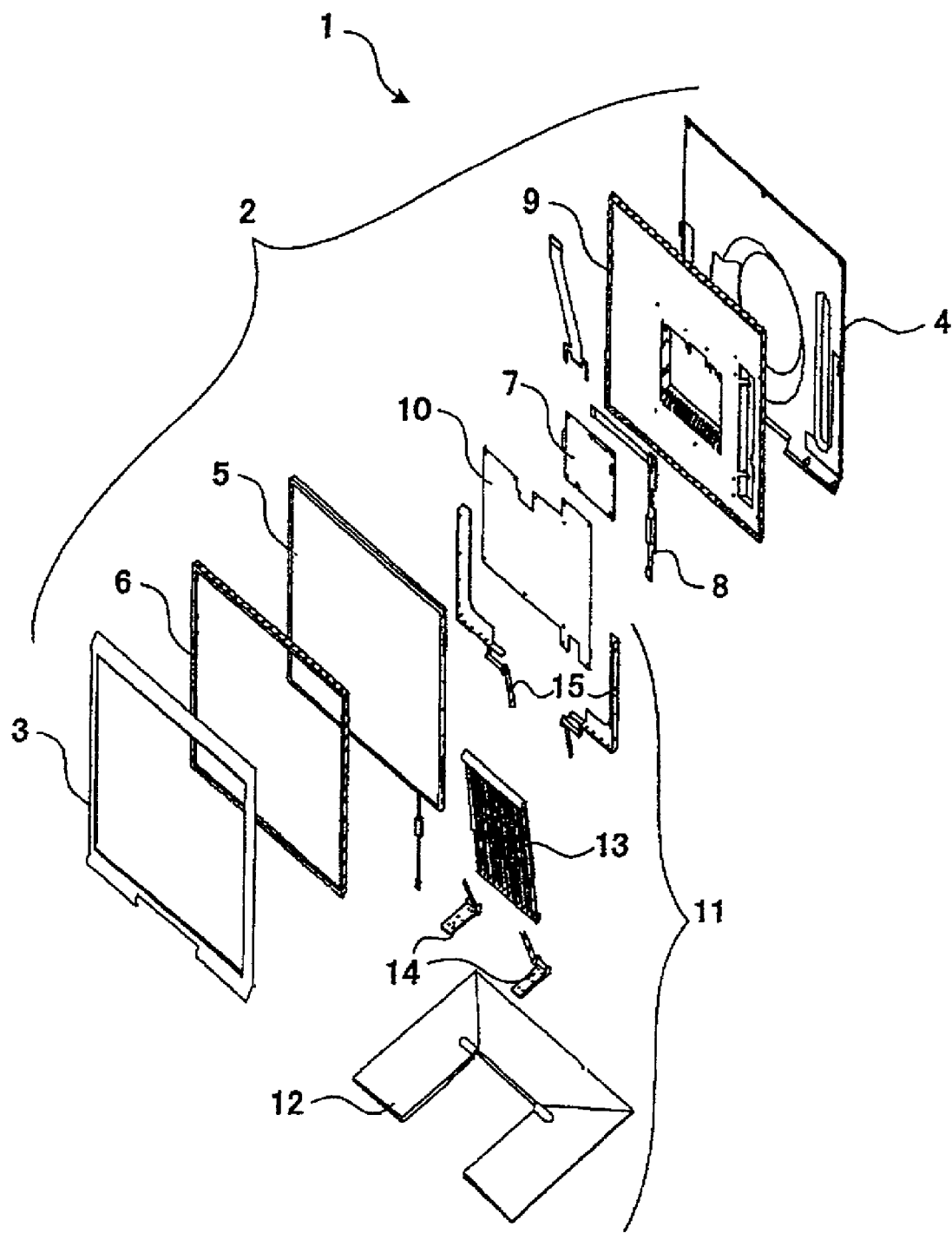
FIG. 1 is an exploded perspective view of a display device 1 according to a first embodiment of the present invention.

FIG. 1 to FIG. 4 are views for explaining a display device 1 of the first embodiment, and FIG. 1 is an exploded perspective view.

As shown in FIG. 1, the display device 1 of the first embodiment is basically comprised of a display portion 2 and a pedestal 11.

The display portion 2 comprises a front cover 3 and a rear cover 4, and a LCD (Liquid Crystal Display) module 5 that is the most important element for image display is arranged between the front cover 3 and the rear cover 4. A front shield 6 is arranged between the LCD module 5 and the front cover 3. Also, an interface card 7 and an inverter 8 are arranged between the LCD module 5 and the rear cover 4. The interface card 7 and the inverter 8 are arranged between the rear shield 9 and an inner shield 10.

The pedestal 11 is made of a pedestal main body 12, arm 13, a pair of hinges 14 that rotatably connects the pedestal main body 12 and the arm 13, a pair of hinges that rotatably connects the arm 13 and the display portion 2.

Figure 2:
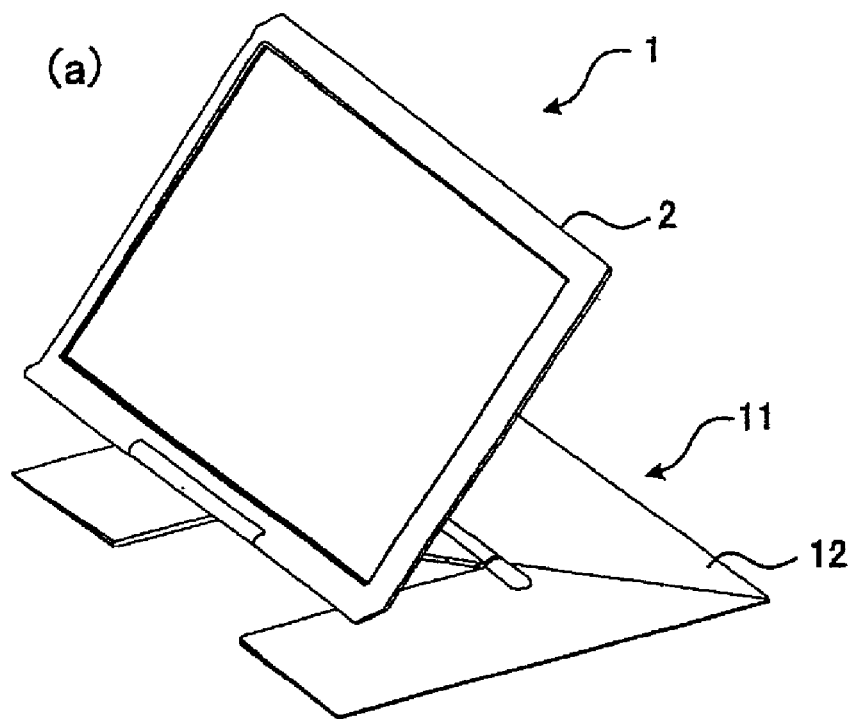
FIG. 2 is a perspective view showing an external view of the display device 1 when it is in use according to the first embodiment.
Figure 2:
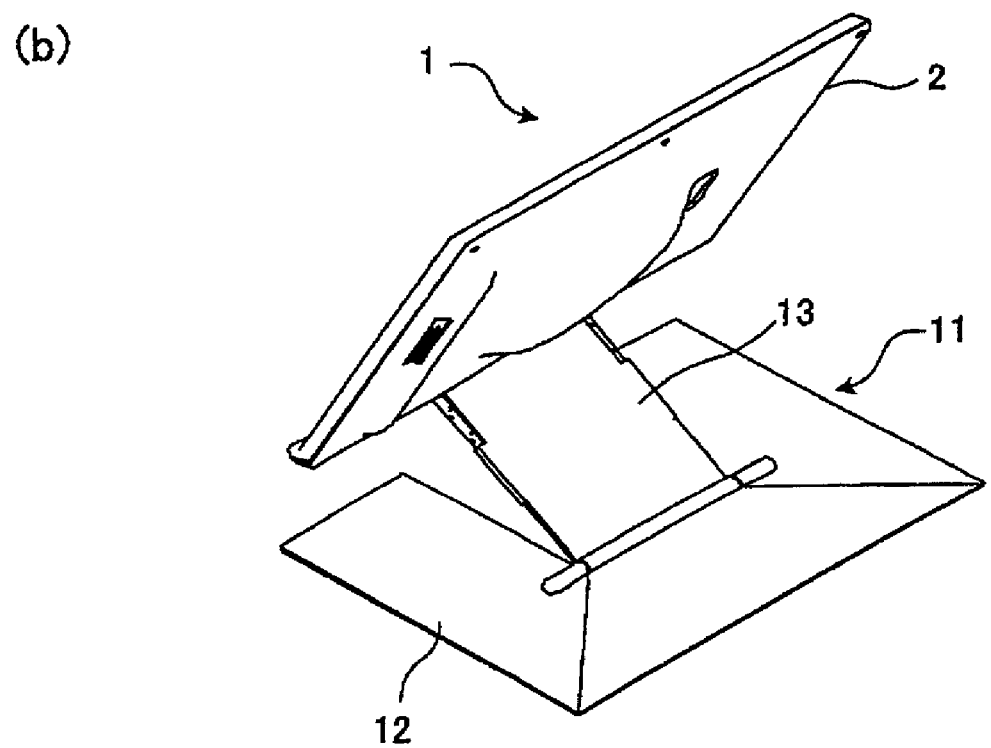
Figure 3:
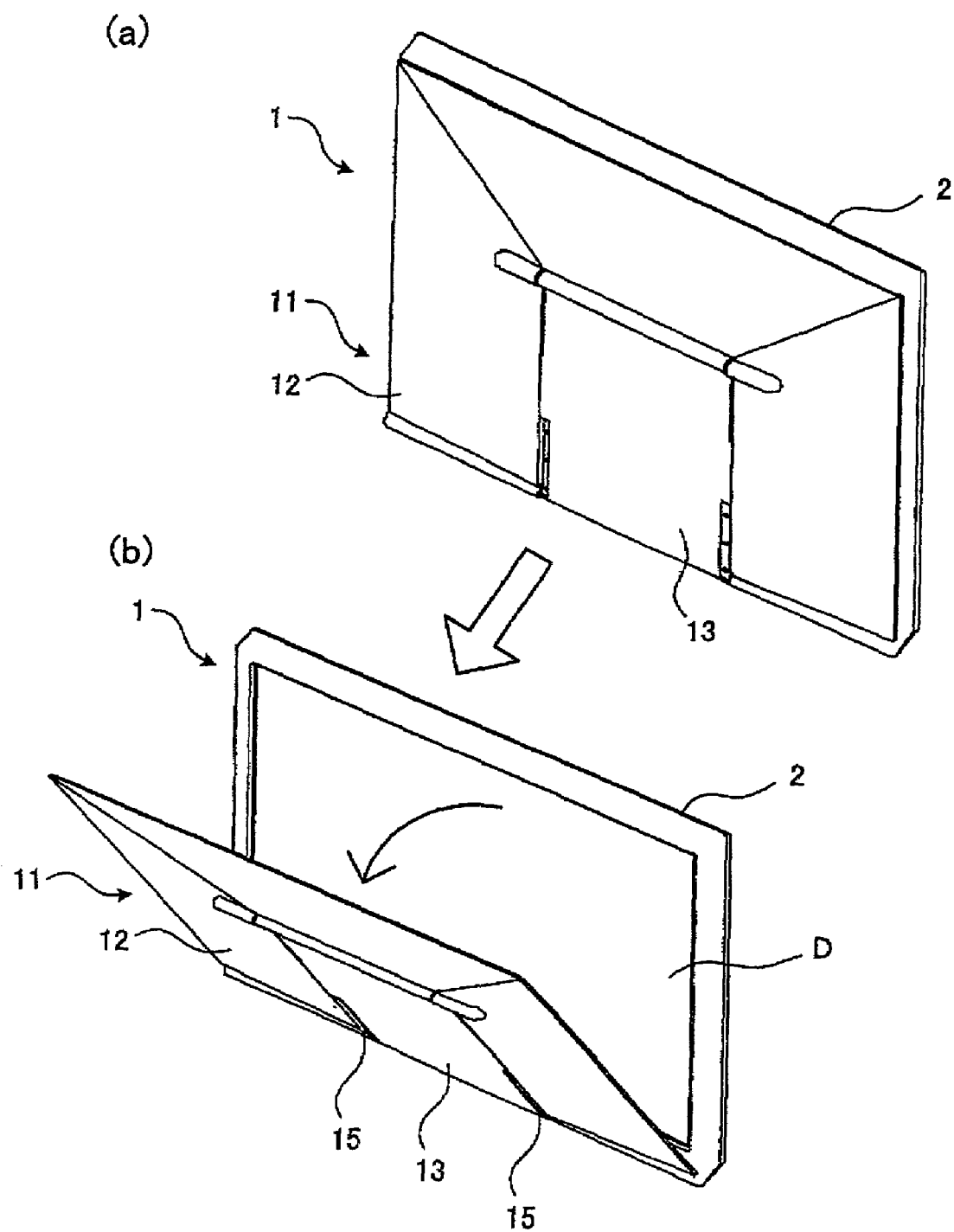
FIG. 3 is a perspective view of the display device 1 according to the first embodiment for explaining a process from a closed state to an opened state for use.
Figure 4:
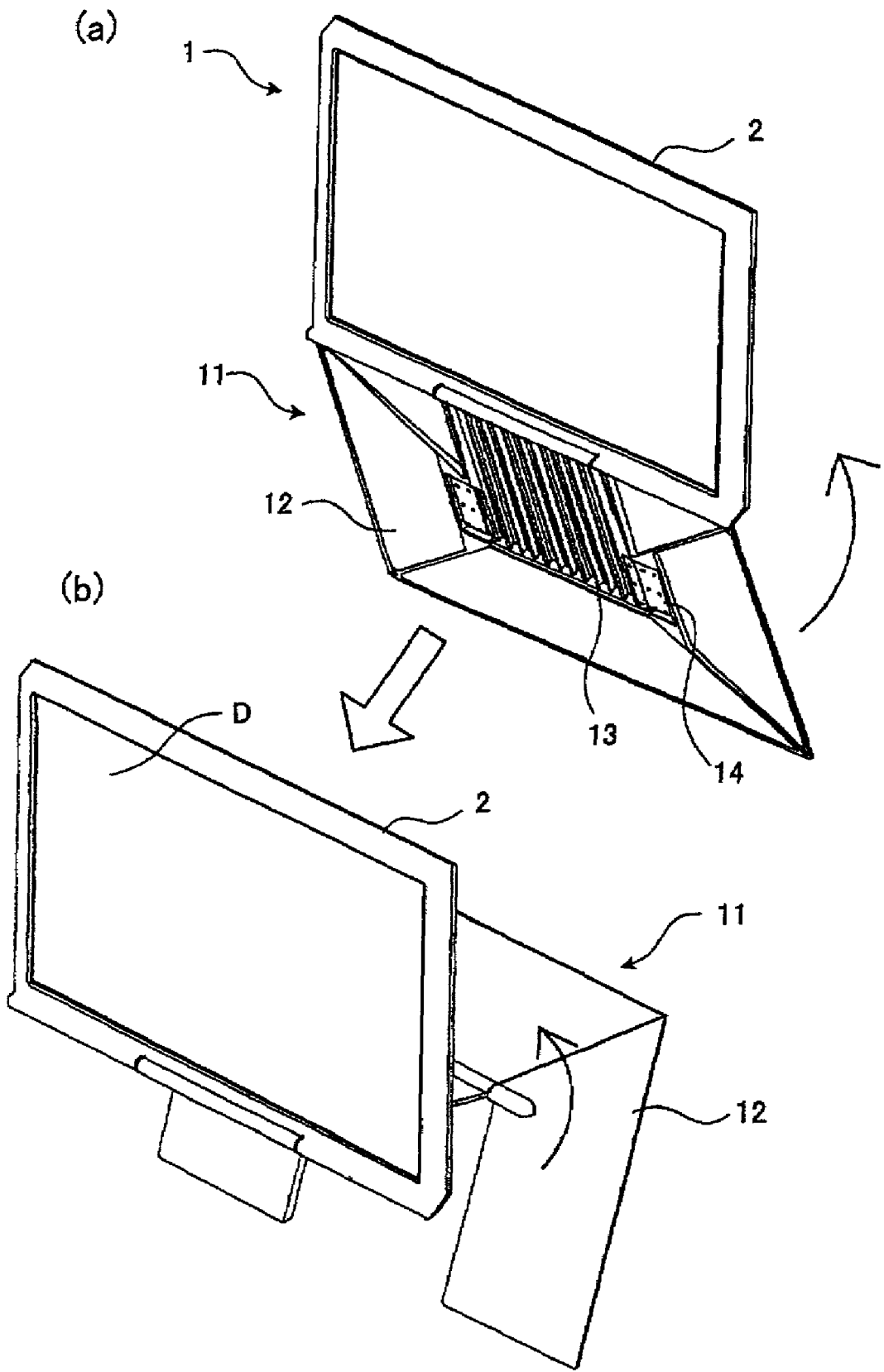
FIG. 4 is a perspective view of the display device 1 according to the first embodiment for explaining a process from a closed state for the purpose of carrying or storage to an opened state for use.

FIG. 2 is a perspective view showing an external view of the display device 1 during its use according to the first embodiment. As shown in FIG. 2, the display device 1 during its use places the pedestal 11, for example, on the top of a desk, and makes the arm 13 being a structural element of the pedestal 11 arrange in a standing manner by a specified angle against the pedestal main body 12. In addition, the display portion 2 is made to tilt to the arm 13 by a specified angle. This specified angle is the one that is appropriately set by a user of the display device according to his/her using posture.

As one can understand from FIG. 2, the center of gravity of the display portion 2 exists within a range of the projection surface of the pedestal 11. Note that the projection surface of the pedestal 11 is the one at the time the pedestal main body 12 and the arm 13 occupy the same plane. Therefore, even if the pedestal 11 is lighten considerably in comparison with the display portion 2, there is no fear that the display device 1 will become unstable. However, because the pedestal 11 has a protective function for the image display portion of the display portion 2, which will be described later, the pedestal 11 is required to have a considerable strength. Accordingly, it is desirable that the pedestal 11 is made from a material that takes the protective function into consideration. For example, in order to comprise a material, both being light and having strength, it is desirable to use a metal having a light specific gravity, for example, materials such as Aluminum (Al) and Titanium (Ti). When these light metals are used, in the case of the display device 1 having a 15-inch diagonal or the like, it is assured that the protection of the image display portion and the original function as the pedestal 11 can be performed while the thickness of the pedestal 11 is made as thin as 2 to 3 mm or less.

The display device 1 according to the first embodiment can be portable or stored in a bookcase or the like. Being portable or storable means that the image display portion of the display portion 2, in such cases, should be protected by a certain kind of a members without being exposed to outside. Therefore, a process from a portable or storable state to a state that the display device 1 is used will be described based on FIGS. 3 and 4.

FIG. 3(a) shows a state that the display device 1 is closed. Specifically, since the display portion 2 and the pedestal 11 are parallelly opposed and the pedestal 11 covers the image display portion of the display portion 2, the image display portion is protected. In this state, the arm 13 is unified with the pedestal main body 12 to constitute the same plane, and performs the protective function for the image display portion of the display portion 2. Moreover, as one can understand from FIG. 3(a), the surface area of the pedestal 11 is approximately equal to the display portion 2, more specifically it is set equal to the surface area (more or less) of the display portion 2 and equal to the surface area or more of the image display portion of the display portion 2.

FIG. 3(b) shows a state that the display device 1 is opened slightly. As described above, the arm 13 and the display portion 2 are rotatably connected by a pair of hinges 15, the display device 1 can be opened by rotating the pedestal 11 against the display portion 2 around the hinges 15 that act as an axis. When the display device is opened, the image display portion D of the display portion 2 is exposed.

FIG. 4(a) shows a state that the pedestal 11 is further rotated from the state of FIG. 3(b). Comparing to the state of FIG. 3(a), the pedestal 11 is rotated approximately by 180 degrees around the hinges 15 as an axis.

FIG. 4(b) shows a state that the pedestal 11 is further rotated from the state of FIG. 4(a) and the pedestal main body 12 is rotated against the arm 13. As described above, the arm 13 and the pedestal main body 12 are connected via the hinges 15, the pedestal main body 12 is made to rotate around the hinges 15.

Once the state of FIG. 4(b) is achieved, the pedestal main body 12 is placed on a desk or the like, and the user of the display device 1 adjusts the angle between the pedestal main body 12 and the arm 13 and the angle between the arm 13 and the display portion 2 according to their preference.

Because the pedestal main body 12 is rotated by 270 degrees or more from the state of FIG. 3(a), the surface of the pedestal 11 that opposes to the image display portion D becomes a placing surface to a placing object such as a desk.

As it has been described, the display device 1 according to the first embodiment can cover the image display portion D of the display portion 2 with the pedestal 11 in a closed state. Therefore, the display device 1 is portable in this state, or storable, for example, into a bookshelf or a cabinet. Additionally, it is possible to prevent the occurrence of the image display portion D's being scratched or impacted during carrying or being stored. Further, the pedestal 11 is made of the pedestal main body 12 and the arm 13, the pedestal main body 12 and the arm 13, and the arm 13 and the display portion 2 are respectively connected so as to rotate. Therefore, the display portion 2 can be adjusted at the angle according to the preference of the user. Since the adjustment of the angle can be performed while the center of gravity of the display portion 2 is positioned within a range of the projection surface of the pedestal 11, there is no fear that the display device 1 will become unstable.

In the first embodiment, the pedestal 11 is made up of the pedestal main body 12 and the arm 13. But even in the case where the pedestal 11 is made of one body, the surface opposing to the image display portion D is made to be a placing surface by rotating the pedestal 11 at 270 degrees or more from the state of FIG. 3(a). Accordingly, the display device 1 can be prevented from being unstable.

In the following, the display device 20 according to the second embodiment of the present invention will be described in detail with reference to FIG. 5 to FIG. 10. The display device 20 according to the second embodiment coincides with the display device 1 according to the first embodiment as to the basic construction, but differs in the point that the display device 20 comprises an angle adjusting mechanism of an outstanding feature.

Figure 5:
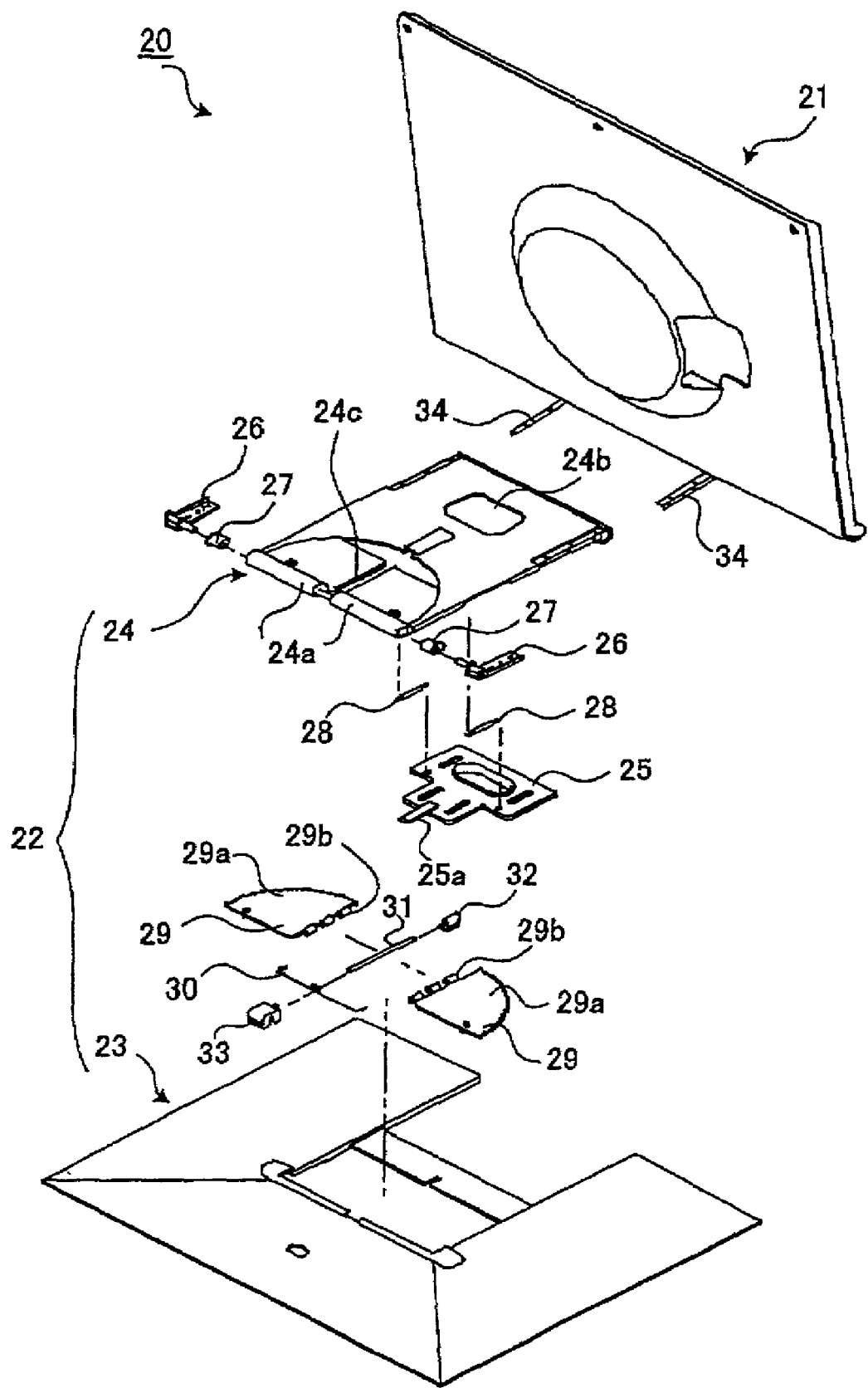
FIG. 5 is an exploded perspective view of a display device 20 according to a second embodiment of the present invention.

FIG. 5 is an exploded perspective view of the display device 20 according to the second embodiment.

As shown in FIG. 5, the display device 20 is basically made from a display portion 21 and a pedestal 22.

The display portion 21 is made of the same elements as the display device 2 of the display device 1 according to the first embodiment.

The pedestal 22 comprises a pedestal main body 23, an arm 24, a sliding lever 25 slidably installed on the back surface of the arm 24 as shown in the drawing, and two wing-shaped stoppers 29 rotatably installed to the pedestal main body 23. On the circular arc peripheral surface of the wing-shaped stoppers 29, concave and convex portions 29a are regularly formed. Moreover, the arm 24 is rotatably connected to the pedestal main body 23 by a pair of hinges 26 and a pair of bushings 27, and the display portion 21 is rotatably connected to the arm 24 by a pair of hinges 34.

The arm 24 comprises a holding axis 24a having holes to be fitted with the bushings 27, an operation opening 24b to operate a slide lever 25, and an opening for standing 24c to stand the wing-shaped stoppers 29. The arm 24 can rotate to the pedestal main body 23 with the holding axis 24a acting as the rotation axis.

The one ends of a pair of coil springs 28 are fixed to the arm 24, and the other ends of which are fixed to the sliding lever 25 that is slidably installed to the back surface of the arm 24 with a screw (not shown). The coil springs 28 apply a force in the left direction in the drawing when the sliding lever 25 is slid in the right direction in the drawing. The sliding lever 25 includes an engaging pawl 25a that engages the concave and convex portions 29a of the wing-shaped stoppers 29.

The wing-shaped stoppers 29 are installed on the pedestal main body 23. The wing-shaped stoppers 29 include axis holding portions 29b in which a rotation axis 31 is inserted, the rotation axis being fixed to the pedestal main body 23. The rotation axis 31 that crosses, more particularly is orthogonal to, the holding axis 24a of the arm 24 is fixed to the pedestal main body 23 with fixtures 32 and 33. The rotation axis 31 is also fixed corresponding to the position where the opening for standing 24c of the arm 24 is formed. A linear spring 30 is used to apply force to the two wing-shaped stoppers 29 in order to keep them in parallel to the pedestal main body 23, and a ring is formed at the central portion in the lengthwise for fitting the rotation axis 31.

Figure 6:
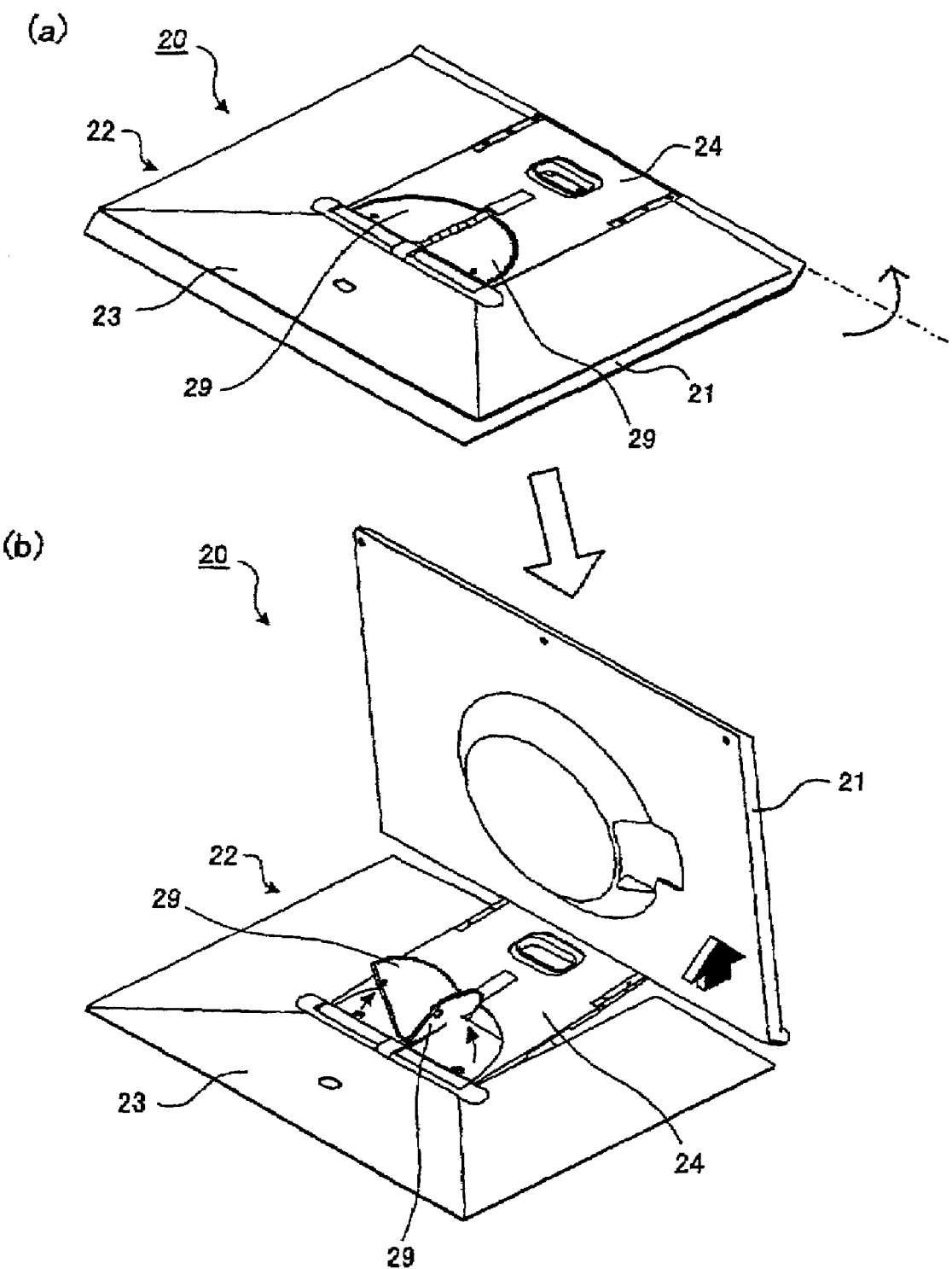
FIG. 6 is a perspective view of the display device 20 according to the second embodiment for explaining a process from a closed state for the purpose of carrying or storage to an opened state for use.

Next, a process from a state that the display device 20 is closed to a state for using will be described by using FIGS. 6 and 7.

FIG. 6(a) is a view showing the state viewed at the pedestal 22 portion that the display device 20 is closed. Specifically, the display portion 21 and the pedestal 22 are parallelly opposed to each other, and the pedestal 22 covers the image display portion of the display portion 21. In this state, the arm 24 is unified with the pedestal main body 23 to constitute the same plane, and performs the protective function for the image display portion of the display portion 21. The surface area of the pedestal 22 is a little smaller than that of the display portion 21, but it is similar to the first embodiment that the surface area of the pedestal 22 is set a little larger than that of the image display portion of the display portion 21.

In FIG. 6(a), when the display portion 21 is rotated in the arrow direction in the drawing by approximately 270 degrees with the pedestal 22 as a reference, the state indicated in FIG. 6(b) is made. FIG. 6(b) shows the state that the arm 24 is rotated to the arrow direction slightly against the pedestal main body 23. Following this rotation, the wing-shaped stoppers 29 rotate around the rotation axis 31 as a center, which are arranged in a standing manner.

Figure 7:
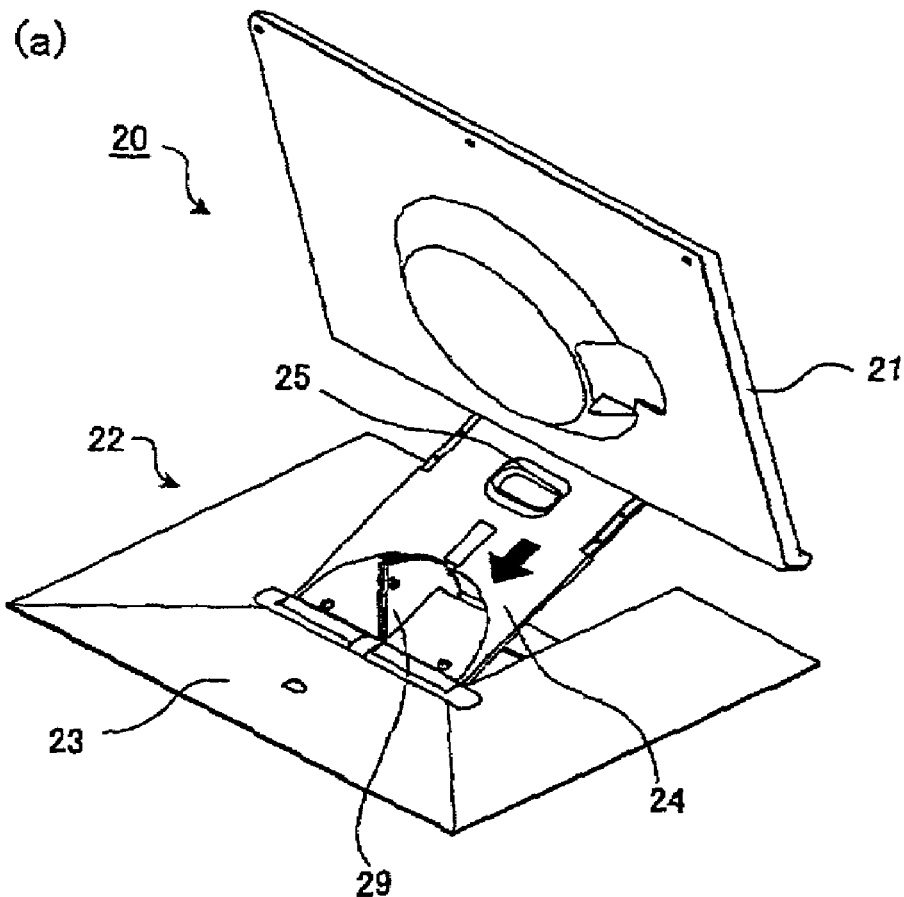
FIG. 7 is a perspective view of the display device 20 according to the second embodiment for explaining a process from a closed state for the purpose of carrying or storage to an opened state for use.
Figure 7:
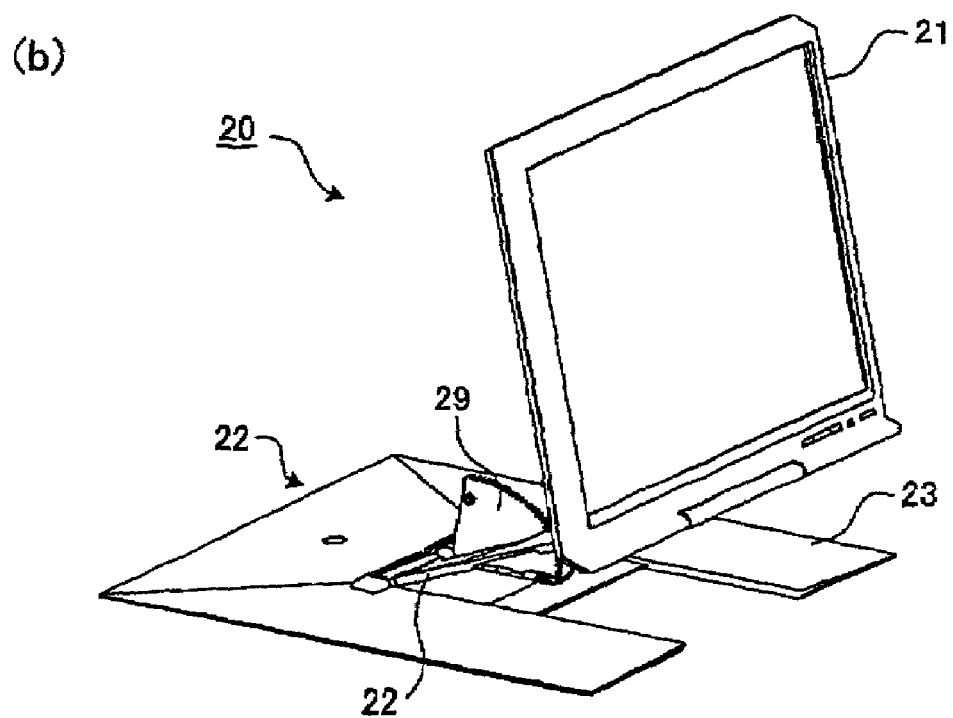

FIG. 7 shows a state that the arm 24 is further rotated against the pedestal main body 23. FIG. 7(a) is a view showing the rear of the display device 20 and FIG. 7(b) is a view showing the front. As one can understand from FIG. 7(a), the two wing-shaped stoppers 29 stand up perpendicularly against the pedestal main body 23. Specifically, the two wing-shaped stoppers 29 become parallel to each other, and can be regarded as if they constitute one wing-shaped stopper 29.

Figure 8:
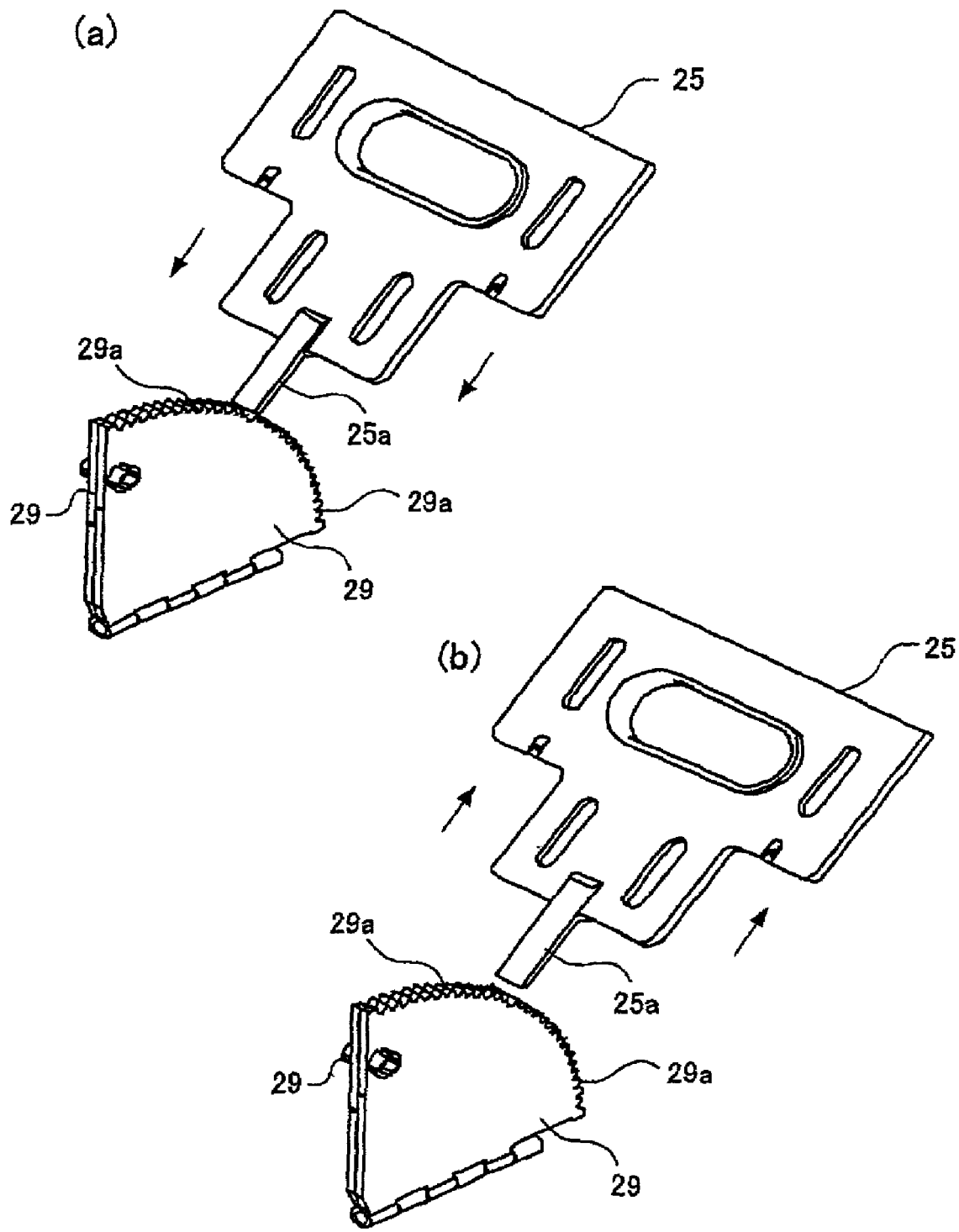
FIG. 8 is a perspective view explaining an angle adjusting mechanism of the display device 20 according to the second embodiment.

FIG. 8 shows an extracted view of the wing-shaped stoppers 29 and the sliding lever 25.

FIG. 8(a) shows a state that the concave and convex portions 29a of the wing-shaped stoppers 29 and the engaging pawl 25a of the sliding lever 25 are engaged.

When the concave and convex portions 29a of the wing-shaped stoppers 29 and the engaging pawl 25a of the sliding lever 25 are engaged, movement of the sliding lever 25 is restricted. Because the sliding lever 25 is installed to the arm 24, the movement of the sliding lever 25 is restricted, and it means that the rotation action of the arm 24 is also restricted. In short, the angle of the arm 24 to the pedestal main body 23 is maintained.

On the other hand, FIG. 8(b) shows a state that engagement between the concave and convex portions 29a of the wing-shaped stoppers 29 and the engaging pawl 25a of the sliding lever 25 is released. Specifically, by sliding the sliding lever 25 in the arrow direction in the drawing, the engagement between the concave and convex portions 29a of the wing-shaped stoppers 29 and the engaging pawl 25a of the sliding lever is released. In this state, the arm 24 is rotatable against the pedestal main body 23, and the arm 24 can be set at a specified angle if the arm 24 is rotated at an optional position and the concave and convex portions 29a of the wing-shaped stoppers 29 and the engaging pawl 25a of the sliding lever 25 are engaged. Note that the engaging pawl 25a, that is, the sliding lever 25 moves along the circular arc engaging surface on which the concave and convex portions 29a of the wing-shaped stoppers 29 are formed.

The sliding lever 25 is applied with a force by the coil spring 28 in the arrow direction in FIG. 8(a). Therefore, when the engagement is released as shown in FIG. 8(b), the sliding lever 25 is required to be slid in the arrow direction in FIG. 8(b) by applying an external force. However, if the external force is released from the state of FIG. 8(b), the sliding lever 25 automatically returns to the engaging state shown in FIG. 8(a) due to the force applied by the coil springs 28.

Figure 9:
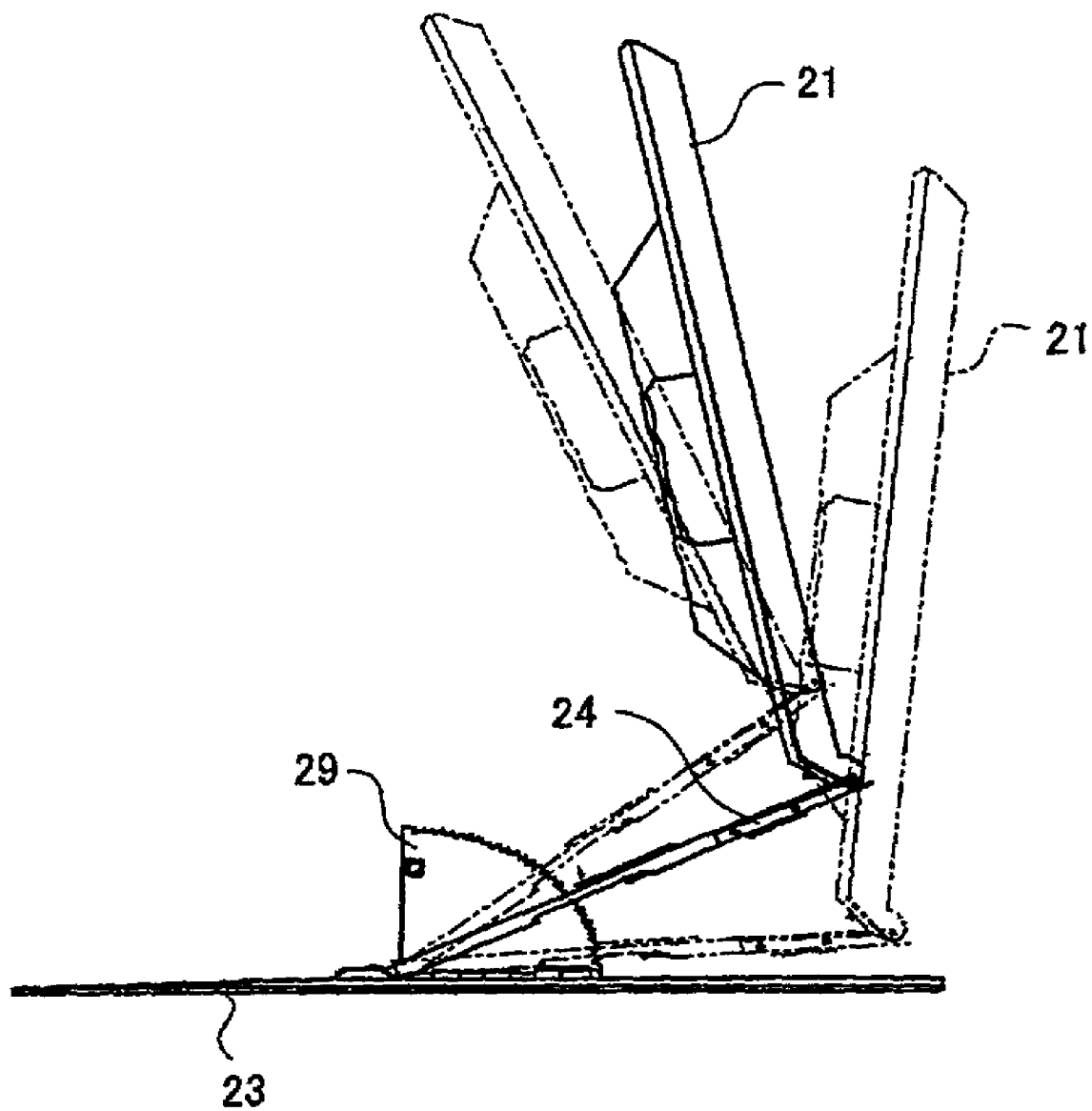
FIG. 9 is a view showing the angle adjustment by an arm 24 of the display device 20 according to the second embodiment.

FIG. 9 shows a side of the display device 20 according to the second embodiment, and shows a state that the angle of the sliding lever 25, in another word, the arm 24 against the pedestal main body 23 is changed. The changing of the angle is performed as described by using FIG. 8.

Figure 10:
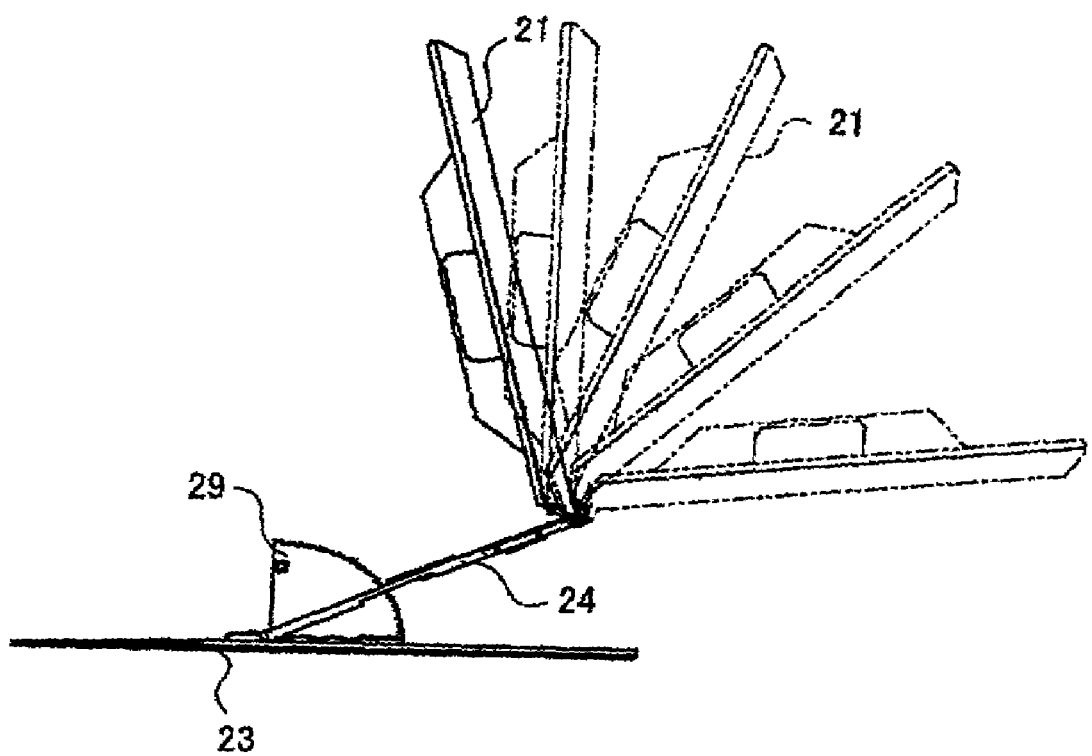
FIG. 10 is a view showing the angle adjustment by a display portion 21 of the display device 20 according to the second embodiment.

And, FIG. 10 shows a state that the angle of the display portion 21 against the arm 24 is changed while the angle of the arm 24 against the pedestal main body 23 is fixed.

In the display device 20 according to the second embodiment, the angle of the arm 24 against the pedestal main body 23 and, further, the angle of the display portion 21 against the arm 24 can be adjusted as shown in FIGS. 9 and 10. This means that the angle adjustment of the display portion 21 is provided to the user of the display device 20 in more minute levels.

In the second embodiment, the angle adjusting mechanism of the arm 24 against the pedestal main body 23 is a significant part of the display device 20. In other words, a mechanism that the wing-shaped stoppers 29 automatically stand up or lie down according to the rotation action of the arm 24 is adopted. In a state that the wing-shaped stoppers 29 are laid down, they occupy the same plane with the pedestal 22 by being arranged in parallel to the pedestal main body 23. In the following, movement of the wing-shaped stoppers 29 will be described with reference to FIG. 11.

Figure 11:
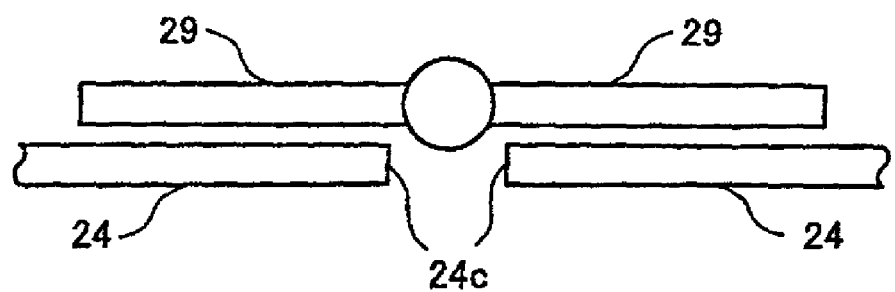
FIG. 11 is a view explaining the angle adjusting mechanism of the display device 20 according to the second embodiment.
Figure 11:
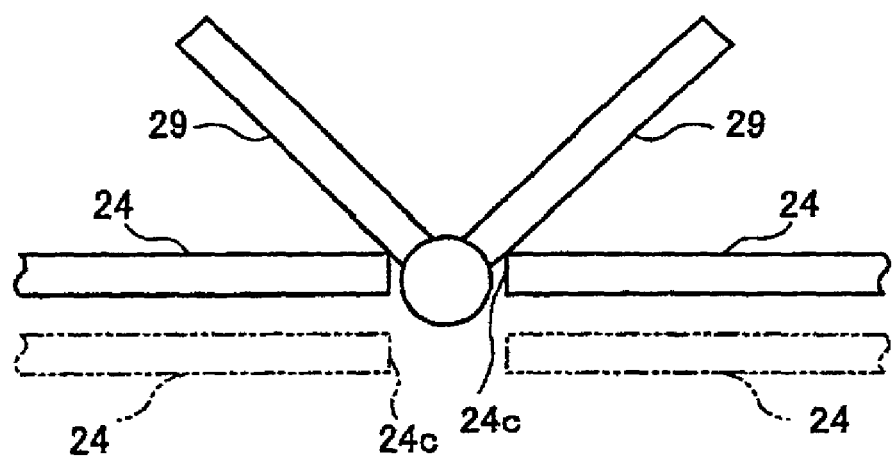
Figure 11:
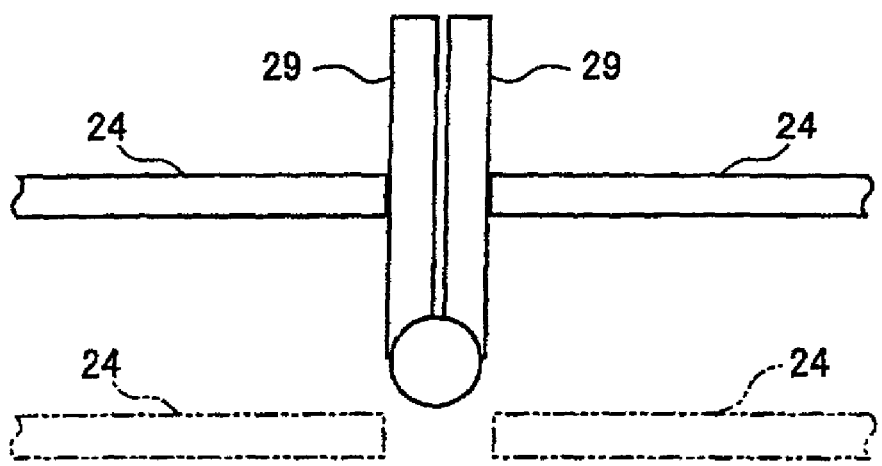

FIG. 11 is an exemplary view showing the relative position relation between the wing-shaped stoppers 29 and the arm 24. FIG. 11(a) shows a state that the arm 24 is parallel to the pedestal main body 23, and FIGS. 11(b) and (c) show states that the wing-shaped stoppers 29 are standing up as the arm 24 rotates against the pedestal main body 23.

As shown in FIG. 11(a), although the wing-shaped stoppers 29 are positioned above the arm 24, the wing-shaped stoppers 29 and the arm 24 are regarded that they occupy the same plane. If the arm 24 rotates for a specified angle from this state, the wing-shaped stoppers 29, as shown in FIG. 11(b), stand up contacting the portions, which face the opening for standing 24c of the arm 24. When the arm 24 further rotates, positions of the portions that contact the wing-shaped stoppers 29 become higher, thus the wing-shaped stoppers 29 stand up vertically as shown in FIG. 11(c). As described above, because the wing-shaped stoppers 29 are applied with a force by the linear spring 30 from the state of FIG. 11(c) in the opening direction, the wing-shaped stoppers 29 are forcibly returned to the state of FIG. 11(a) as the position of the arm 24 comes down from the state of FIG. 11(c).

In the above embodiment, two pieces of wing-shaped stoppers 29 are used, but the embodiment can be realized with a one piece wing-shaped stopper. Alternatively, the wing-shaped stoppers 29 may be provided on the rotation axis 31 along the periphery of the arm 24.

As described above, according to the second embodiment, the angle adjustment of the arm 24 and further the display portion 21 can be performed by providing the wing-shaped stoppers 29 that are capable of standing up without providing any special driving means. Moreover, because the wing-shaped stoppers 29 occupy the same plane with the pedestal main body 23 when the display device 20 is not in use, no hindrance will occur as to the portability or to the storability.

Moreover, similarly to the first embodiment, the pedestal 22 is made of the pedestal main body 23 and the arm 24, and the image display portion of the display portion 21 can be protected with the pedestal main body 23 and the arm 24 when the display device 20 is not in use. Further, when the display device 20 is in use, the angle adjustment of the display portion 21 can be optimally maintained while the center of gravity of the display portion 21 is kept within a range of the projection surface of the pedestal main body 23 due to the existence of the arm 24. Therefore, there is no fear that the display device 20 will be unstable.

As described above, according to the display device of the present invention, an image display portion is protected when a display device is being carried or stored, and the angle adjustment can be performed without fear of upsetting when it is in use.

According to the angle adjusting device of the present invention, stoppers for the angle adjustment can be made to stand up automatically, and an arm to which the angle adjustment is performed and the stoppers can occupy the same plane. Therefore, the angle adjustment of the display portion can be performed without hindering the portability or storability of the display device.

Although the preferred embodiments of the present invention have been described in detail, it should be understood that various changes, substitutions and alternations can be made therein without departing from spirit and scope of the inventions as defined by the appended claims.

The invention claimed is:

1. A display device comprising:
   a pedestal having a planar pedestal main body and a planar arm portion that is arranged in a standing manner at a specified angle to said pedestal main body; and
   a display portion being installed swingably to said arm and having an image display portion,
   wherein the swinging angle of said display portion can be optimally set when the center of gravity of said display portion is within a projection surface area of said pedestal, and
   wherein said pedestal main body and said arm portion can be positioned in the same plane for unifying said pedestal main body with said arm portion to cover said image display portion.

2. The display device according to claim 1, wherein said pedestal, when said pedestal main body and said arm portion are in the same plane, includes the approximate same surface area as said display portion.

3. A display device comprising:
   a display portion having an image display portion for displaying an image based on inputted data, and
   a planar protective portion rotatably installed to said display portion around a peripheral portion thereof as a rotation axis and parallelly opposed to said display portion to cover said image display portion,
   wherein a first section of said planar protective portion opposing said display portion functions as a pedestal for supporting said display portion,
   wherein a second section of said planar protective portion opposing said display portion includes an arm connected between said first section and said display portion and capable of being arranged at an angle with respect to the first section for fixing the display portion in a desired position, and
   wherein the first section and the second section can be unified to constitute one plane.

4. The display device according to claim 3, wherein the thickness of said planar protective portion is thinner than the thickness of said display portion.

5. The display device according to claim 3, wherein the weight of said planar protective portion is lighter than the weight of said display portion.

6. The display device according to claim 3, wherein the first section of said planar protective portion functions as the pedestal by rotating for 270 degrees or more from the state in which said planar protective portion covers said image display portion by parallelly opposing said display portion.

7. A display device comprising:
   a display portion having an image display portion for displaying an image based on inputted data, and
   a supporting portion for supporting said display portion in a manner that a supporting angle is adjustable, wherein said supporting portion consists of an arm to which the display portion is rotatably installed and a pedestal to which the arm is rotatably installed, and said arm and said pedestal are capable of being arranged so as to be unified with each other in the same plane, and wherein, when said arm and said pedestal are unified with each other in the same plane, said arm and said pedestal cover said image display portion.

8. The display device according to claim 7, wherein the surface area of said supporting portion when said arm and said pedestal are unified with each other in the same plane is greater than or equal to the surface area of said image display portion.

9. An angle adjusting device comprising:
a pedestal that becomes a reference of the angle adjustment,
an arm that is provided for said pedestal so as to be rotatable in a specified angle range and has an engaging portion, and
a stopper, which performs a rotation action by following the rotation action of said arm and that includes an engaging surface to engage said arm, wherein said engaging surface includes a plurality of areas for engaging said engaging portion to fix the arm at a plurality of angles with respect to the pedestal.

10. The angle adjusting device according to claim 9, wherein an engagement of said arm with said stopper is released while said arm rotates.

11. The angle adjusting device according to claim 9, wherein the engaging surface of said stopper is made in the shape of a circular arc, and the engaging portion of said arm moves along the circular arc engaging surface of said stopper.

12. An angle adjusting device in which a second member supports a first member at an optimum angle, comprising:
a pedestal that becomes a reference of the angle adjustment,
said first member that is rotatably arranged around a first rotation axis provided on the pedestal, and
said second member that is rotatably arranged around a second rotation axis provided on the pedestal so as to cross said first rotation axis and a portion of said second member is positioned above said first member, wherein rotation of said second member around the second rotation axis is caused by rotation of said first member around said first rotation axis.

* * * * *